(12) United States Patent
Lin et al.

(10) Patent No.: US 7,779,384 B2
(45) Date of Patent: Aug. 17, 2010

(54) MANAGING VISUAL RENDERINGS OF TYPING CLASSES IN A MODEL DRIVEN DEVELOPMENT ENVIRONMENT

(75) Inventors: Cheng-Yee Lin, Tualatin, OR (US); Peter J. Parapounsky, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1636 days.

(21) Appl. No.: 11/022,465

(22) Filed: Dec. 22, 2004

(65) Prior Publication Data
US 2006/0136865 A1    Jun. 22, 2006

(51) Int. Cl.
*G06F 9/44*    (2006.01)
*G06F 3/048*    (2006.01)

(52) U.S. Cl. .............. 717/105; 717/113; 717/108; 717/116; 715/771; 715/763; 715/967; 715/970

(58) Field of Classification Search ............... None
See application file for complete search history.

(56) References Cited

U.S. PATENT DOCUMENTS

| | | | | |
|---|---|---|---|---|
| 5,623,591 | A * | 4/1997 | Cseri ................... | 715/762 |
| 5,784,620 | A | 7/1998 | Isham | |
| 6,185,611 | B1 | 2/2001 | Waldo et al. | |
| 6,185,732 | B1 * | 2/2001 | Mann et al. .............. | 717/128 |
| 6,219,826 | B1 * | 4/2001 | De Pauw et al. .......... | 717/116 |
| 6,243,857 | B1 * | 6/2001 | Logan et al. ............. | 717/111 |
| 6,268,850 | B1 * | 7/2001 | Ng ........................ | 715/866 |
| 6,269,475 | B1 * | 7/2001 | Farrell et al. ............ | 717/113 |
| 6,604,127 | B2 * | 8/2003 | Murphy et al. ........... | 709/203 |
| 6,643,668 | B2 * | 11/2003 | Sluiman ................... | 1/1 |
| 7,092,835 | B2 * | 8/2006 | Bostanci et al. .......... | 702/108 |
| 7,370,315 | B1 * | 5/2008 | Lovell et al. ............. | 717/100 |
| 7,386,835 | B1 * | 6/2008 | Desai et al. .............. | 717/117 |
| 2002/0016954 | A1 * | 2/2002 | Charisius et al. .......... | 717/2 |
| 2003/0222918 | A1 * | 12/2003 | Coulthard ................ | 345/780 |

(Continued)

OTHER PUBLICATIONS

Mark Brunelli, The Holy Grail of model-driven development [online], Aug. 10, 2004 [retrieved on Mar. 22, 2010], Retrieved from the Internet: <URL: http://searchsoa.techtarget.com/news/interview/0,289202,sid26_gci999474,00.html>, pp. 1-3.*

(Continued)

*Primary Examiner*—Tuan Q Dam
*Assistant Examiner*—Hanh T Bui
(74) *Attorney, Agent, or Firm*—Daniel P. McLoughlin, Esq.; Steven M. Greenberg, Esq.; Carey, Rodriguez, Greenberg & Paul, LLP

(57) ABSTRACT

A method, system and apparatus for managing visual renderings of typing classes in a model driven development environment. The method can include toggling a visual rendering of a typing class for a specified typed member in a visually rendered owner class in response to a selection of an activatable toggle disposed in proximity to the visually rendered owner class in the model driven development environment. The toggling step further can include toggling a visual rendering of a linkage between the typing class and the visually rendered owner class responsive to the selection. Additionally, the toggling step further can include the step of toggling an appearance of the activatable toggle responsive to the selection.

11 Claims, 3 Drawing Sheets

U.S. PATENT DOCUMENTS

2004/0003335 A1* 1/2004 Gertz et al. .................. 714/758
2004/0064456 A1* 4/2004 Fong et al. .................. 707/100

OTHER PUBLICATIONS

Alan Brown, An Introduction to Model Driven Architecture [online], Feb. 17, 2004 [retrieved on Mar. 22, 2010], Retrieved from the Internet: <URL: http://www.ibm.com/developerworks/rational/library/3100.html>, pp. 1-12.*

Model Driven Development fro J2EE Utilizing a Model Driven Architecture (MDA) Approach [online], Jun. 2003 [retrieved on Mar. 25, 2010], Retrieved from the Internet: <URL: http://www.omg.org/mda/mda_files/MDA_Comparison-TMC_final.pdf>, pp. 1-18.*

Wolfgang Grieskamp, Nikolai Tillmann, and Margus Veanes, Instrumenting Scenarios in a Model-Driven Development Environment [online], 2004 [retrieved on Mar. 25, 2010], Retrieved from the Internet <URL: http://research.microsoft.com/apps/pubs/default.aspx?id=77816>, pp. 1027-1036.*

* cited by examiner

MANAGING VISUAL RENDERINGS OF TYPING CLASSES IN A MODEL DRIVEN DEVELOPMENT ENVIRONMENT

BACKGROUND OF THE INVENTION

1. Statement of the Technical Field

The present invention relates to field of software development and more particularly to the model driven development of a software application.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits which can include a better understanding of the business or engineering situation at hand, the construction and design of application architectures, and the creation of visualizations of code and other forms of implementation. In this regard, the essence of modeling is abstraction and any visualization of code is indeed an abstraction in that application information can be selectively exposed while details deemed unnecessary or unwanted can be suppressed. In conventional MDD, visual models can be created utilizing model constructs or model types.

At the core of contemporary visual modeling, an object-oriented model can include several classes having both data and method members. The classes can be inter-related to one another and the relationship between different classes can be reflected visually in the model as it will be understood by the skilled artisan. Thus, to provide a high degree of visualization, object-oriented modeling tools can lay out model elements in diagrams so the reader can visually conceive the overall design of the software application.

The modeling of a class and its contained members plays a key role in the visualization of an associated software model. A member of a class, by definition, is contained by the class itself. Naturally, the object-oriented model can visually represent a member as an entity inside a visually discernible shape which represents its owner class. The member itself can have a type attribute. That is, a member itself is an entity of a certain type which also is represented as a class. In this regard, the class that represents the type often is referred to as a "typing class", to be distinguished from the owner class containing the member.

Referring to FIGS. 1A and 1B, the type of a class member 120 often is represented textually within the visual representation of the class 110. Alternatively, the type of a class member 120 can be represented graphically. In particular, where the typing class 130 of a class member 120 is represented graphically, a visual linkage 140 between the typing class 130 and the class 110 containing the member 120 can be visually rendered. This latter form of representation can be most convenient for visualizing an object-oriented model. Yet, where many members of many classes have many multiple typing classes, visually representing each typing class in the visual model result in a cluttered visual model. A cluttered visual model, in turn, can defeat the intent of the visual model—to provide a clear visualization of a model.

SUMMARY OF THE INVENTION

The present invention addresses the deficiencies of the art in respect to visually modeling typing classes in an object-oriented visual model and provides a novel and non-obvious method, system and apparatus for the management of visual renderings of typing classes in a visual object-oriented model. In this regard, a system for managing visual renderings of typing classes for corresponding class members can include a visual rendering disposed in a model driven development environment of an owner class having a specified typed member. The system further can include an activatable toggle disposed in the environment in proximity to the specified typed member. The activatable toggle can have an association with logic programmed to toggle a visual rendering of a typing class for the specified typed member.

In one aspect of the invention, the specified typed member can include a textual member name and a corresponding textual type. Moreover, the activatable toggle can include at least two appearances. The first appearance can include an inward pointing arrow and a second appearance can include an outward pointing arrow. Finally, the logic can include further programming to toggle a visual rendering of a linkage between the typing class and the owner class.

In a model driven development environment, a method for managing visual renderings of typing classes for corresponding class members can include toggling a visual rendering of a typing class for a specified typed member in a visually rendered owner class in response to a selection of an activatable toggle disposed in proximity to the visually rendered owner class in the model driven development environment. The toggling step further can include toggling a visual rendering of a linkage between the typing class and the visually rendered owner class responsive to the selection. Additionally, the toggling step further can include the step of toggling an appearance of the activatable toggle responsive to the selection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for managing the visual rendering of a typing class in a model driven development environment. In accordance with the present invention, a typed member of an owner class can be graphically rendered in a model driven development environment along with an activatable widget for the typed member of the owner class. The activatable widget can toggle between visually representative states of the typing class. For instance, the typing class of the typing member can be graphically rendered in the environment along with the owner class. A graphical linkage between the owner class and typing class further can be rendered to represent the association between the owner class and the typing class.

Advantageously, however, in a toggled state, the graphical representation of the typing class and corresponding linkage can be removed from display in the environment. In this way, the visual representation of the typing class can be collapsed so as to avoid a cluttering of the visual model. Yet, where further visual detail is required for the typing class of a typed member of an owner class in the visual model, the activatable widget can be selected to expand the typing class into its visual representation in the visual model in the model driven development environment. In more particular illustration, FIG. 2 is an object diagram illustrating an extensible visual representation of a class having a member and a typing class for the member in accordance with the inventive arrangements.

Figure 1A:
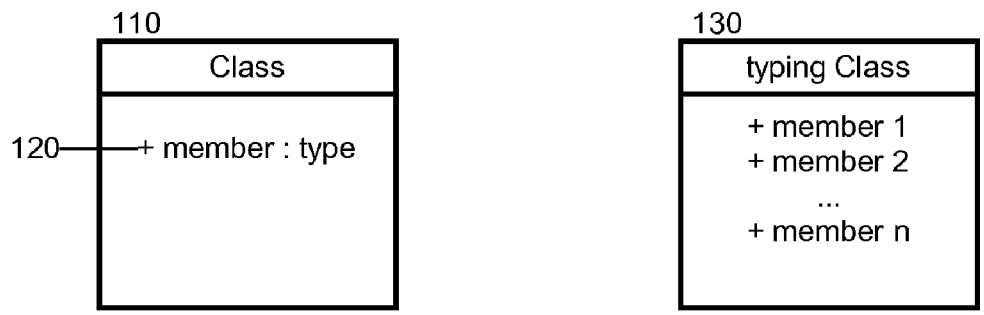
FIGS. 1A and 1B, taken together, are object diagrams illustrating a conventional visual representation of a class having a member and a typing class for the member.
Figure 1B:
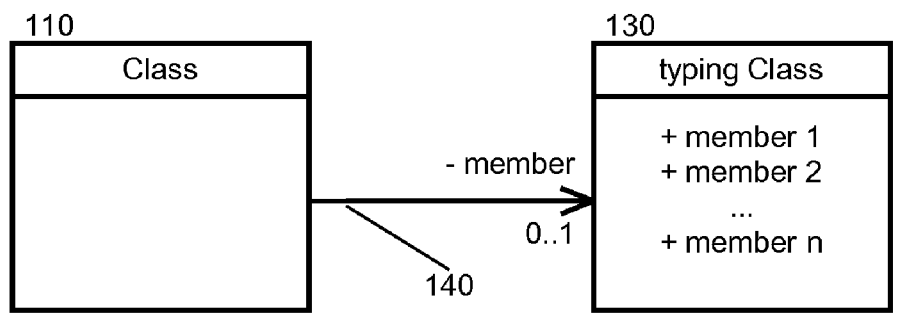
Figure 2:
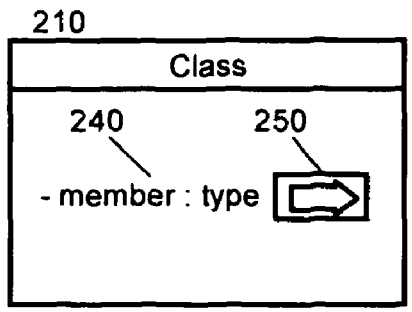
FIG. 2 is an object diagram illustrating an extensible visual representation of a class having a member and a typing class for the member in accordance with the inventive arrangements; and, FIG. 3 is a flow chart illustrating a process for extending and contracting a visual rendering of a typing class for a class member in accordance with the present invention.
Figure 2:
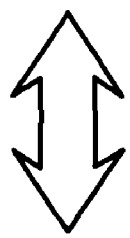
Figure 2:
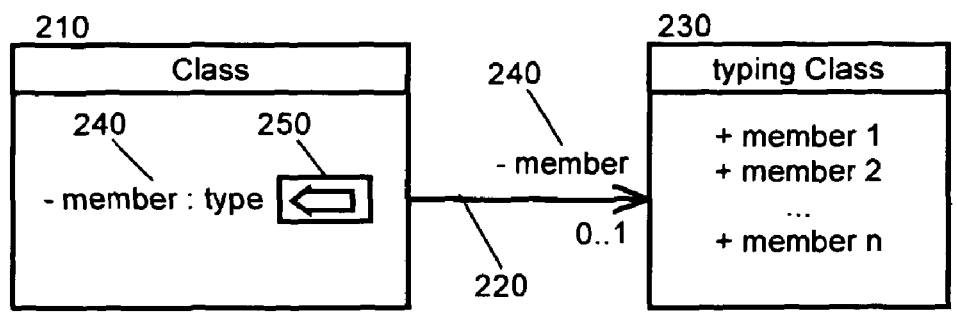

As shown in FIG. 2, an owner class 210 can be visually rendered in a visual model in a model driven development environment to include at least one member 240 having an associated type. In accordance with the present invention, an activatable toggle 250 can be disposed in the rendering of the owner class 210 in proximity to a corresponding member 240. The activation of the activatable toggle 250 can expand the visual model to include a visual rendering of a typing class 230 for the member 240 along with a visual linkage 220 between the owner class 210 and the typing class 230. Notably, the appearance of the activatable toggle 250 can change subsequent to the activation of the activatable toggle 250 to indicate that a re-selection of the activatable toggle 250 can cause the removal of the visual rendering of the typing class 230 and the visual linkage 220.

Figure 3:
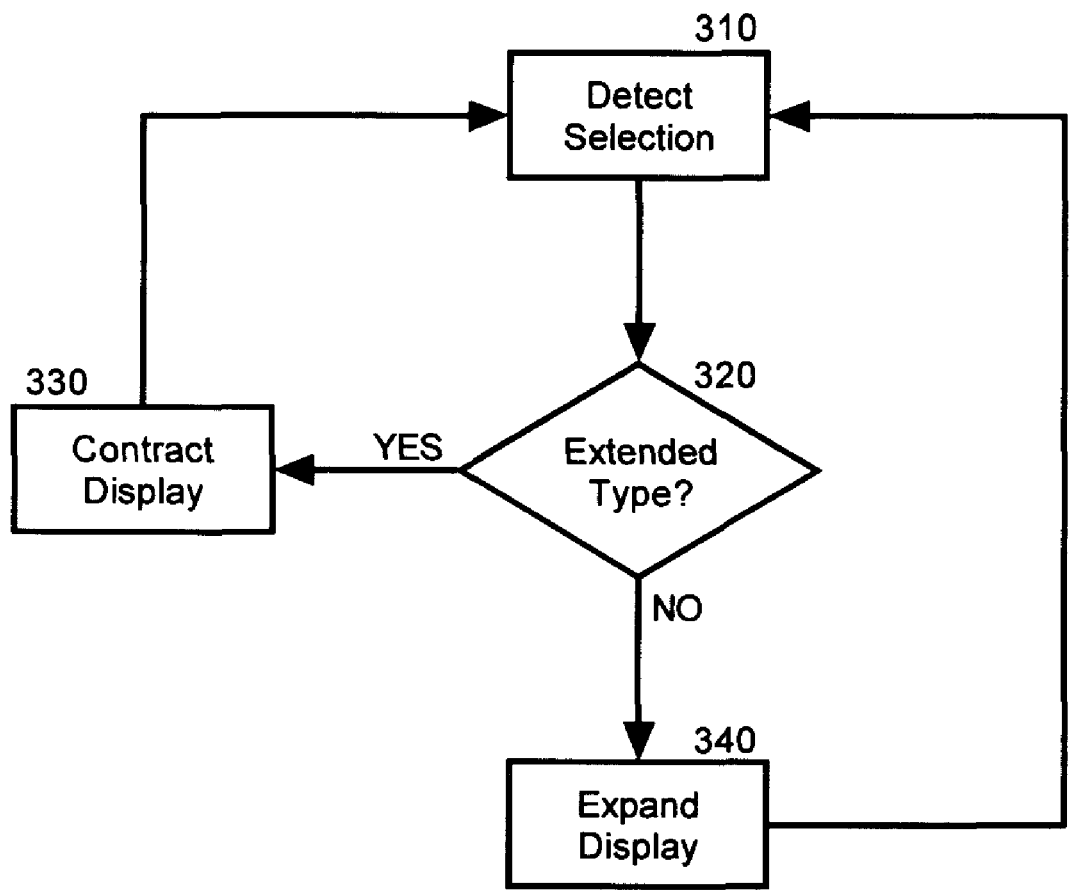

In more specific illustration of the operation of the activatable toggle 250, FIG. 3 is a flow chart illustrating a process for extending and contracting a visual rendering of a typing class for a class member in accordance with the present invention. Beginning in block 310, a selection of the activatable toggle can be detected. The selection can include, by way of non-limiting example, a mouse-click event, mouse-over event, keyboard selection event, to name only a few. In decision block 320, if it is determined that the typing class for the member class associated with the toggle is in an extended state, in block 330 the visual rendering of the typing class can be removed from display in the visual model. Otherwise, in block 340 the typing class can be visually rendered in the visual model and a visual linkage can be established between the typing class and owner class.

In both cases, the appearance of the activatable toggle can change to indicate the operation of the activatable toggle when selected. For example, when the typing class is hidden view in a collapsed state, the activatable toggle can include a right-pointing arrow, indicating that a selection of the activatable toggle can cause the extension of the typing class. By comparison, when the typing class has been visually rendered in the visual model, the activatable toggle can include a left-pointing arrow, indicating that a selection of the activatable toggle can cause the contraction of the typing class.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a model driven development environment, a system for managing visual renderings of associated relationships of typing classes for corresponding class members, the system comprising:

a visual rendering, disposed in the model driven development environment provided by a computer program executing in a computer system, of an owner class comprising a specified typed member; and, an activatable toggle, disposed in the environment provided by the computer program executing in the computer system, in proximity to said specified typed member, said activatable toggle having an association with logic programmed to toggle a visual rendering of a corresponding typing class for said specified typed member of the owner class.

2. The system of claim 1, wherein said specified typed member comprises a textual member name and a corresponding textual type.

3. The system of claim 1, wherein said activatable toggle comprises at least two appearances.

4. The system of claim 3, wherein said appearances comprise an inward pointing arrow and an outward pointing arrow.

5. The system of claim 1, wherein said logic comprises further programming to toggle a visual rendering of a linkage between said typing class and said owner class.

6. In a model driven development environment provided by a computer program executing in a computer system, a method for managing visual renderings of associated relationships of typing classes for corresponding class members, the method comprising the step of toggling, in the model driven development environment provided by a computer program executing in the computer system, a visual rendering of a corresponding typing class for a specified typed member of the owner class in a visually rendered owner class responsive to a selection of an activatable toggle disposed in proximity to said visually rendered owner class in the model driven development environment.

7. The method of claim 6, wherein said toggling step further comprises the step of toggling a visual rendering of a linkage between said typing class and said visually rendered owner class responsive to said selection.

8. The method of claim 6, wherein said toggling step further comprises the step of toggling an appearance of said activatable toggle responsive to said selection.

9. A machine readable storage having stored thereon a computer program for managing visual renderings of associated relationships of typing classes for corresponding class members, the computer program comprising a routine set of instructions which when executed by a machine, causes the machine to perform the step of toggling a visual rendering of a corresponding typing class for a specified typed member of the owner class in a visually rendered owner class responsive to a selection of an activatable toggle disposed in proximity to said visually rendered owner class in a model driven development environment.

10. The machine readable storage of claim 9, wherein said toggling step further comprises the step of toggling a visual rendering of a linkage between said typing class and said visually rendered owner class responsive to said selection.

11. The machine readable storage of claim 9, wherein said toggling step further comprises the step of toggling an appearance of said activatable toggle responsive to said selection.

* * * * *